United States Patent
Hsu et al.

(10) Patent No.: US 6,259,540 B1
(45) Date of Patent: Jul. 10, 2001

(54) DISTINGUISHING METHOD FOR OBJECT SCANNED BY SCANNING DEVICE

(75) Inventors: Adolf T. R. Hsu, Yunlin Hsien; Ching-Chih Fan, Hsinchu, both of (TW)

(73) Assignee: Mustek Systems, Inc., Hsinchu (TW)

( * ) Notice: Subject to any disclaimer, the term of this patent is extended or adjusted under 35 U.S.C. 154(b) by 0 days.

(21) Appl. No.: 09/116,159

(22) Filed: Jul. 15, 1998

(51) Int. Cl.⁷ .................................................. H04N 1/04
(52) U.S. Cl. .................... 358/474; 358/475; 358/486; 358/487
(58) Field of Search .................... 358/474, 486, 358/488, 498, 487, 475, 509, 505; 340/347; 350/96

(56) References Cited

U.S. PATENT DOCUMENTS

| | | | |
|---|---|---|---|
| 4,588,982 | * 5/1986 | Goodwin et al. | 340/347 |
| 4,891,711 | * 1/1990 | Tomita | 358/448 |
| 4,926,267 | * 5/1990 | Shu et al. | 358/454 |
| 4,953,933 | * 9/1990 | Asmar | 350/96 |
| 5,140,443 | * 8/1992 | Iwahara et al. | 358/474 |
| 5,392,100 | * 2/1995 | Yoshida | 358/497 |
| 5,455,873 | * 10/1995 | Cameron | 382/270 |
| 5,574,274 | * 11/1996 | Rubley et al. | 250/208.1 |
| 5,673,125 | * 9/1997 | Merecki et al. | 358/487 |
| 5,705,805 | * 1/1998 | Han | 358/474 |
| 6,005,990 | * 12/1999 | Barrett | 382/323 |

\* cited by examiner

*Primary Examiner*—Cheukfan Lee

(57) ABSTRACT

A method adapted for distinguishing an object scanned by a transmissive/reflective scanning device for as a transmissive object or a reflective object. The scanning device includes a transmitting light source and a reflecting light source. The method includes the steps of (a) turning on one of the light sources, (b) scanning a first portion of the object to obtain a first image signal by using the light source turned on int the step (a), (c) calculating a first scanning value of the first image signal, (d) turning off the first light source turned on in the step (a) and turing on the other light source, (e) scanning a second portion of the object to obtain a second image signal by using the light source turned on in the step (d), (f) calculating a second scanning value of the second image signal, and (g) comparing the scanning values to distinguish the object to be one of the transmissive object and the reflective object.

24 Claims, 1 Drawing Sheet

DISTINGUISHING METHOD FOR OBJECT SCANNED BY SCANNING DEVICE

FIELD OF THE INVENTION

The present invention is related to a distinguishing method for an object sensed by an optical device, and more particularly to a distinguishing method for an object scanned by a transmissive/reflective scanning device.

BACKGROUND OF THE INVENTION

At the present time, the scanners are so popular that they are required to have more and more functions. The flatbed scanner used today has both transmissive mode and reflective mode, and so does the sheetfed scanner. When a reflective object such as a piece of paper needs to be scanned, the reflective mode must be adopted. The light source (hereafter called "reflecting light source") mounted at the same side of the charge coupled device is used to scan the reflective object. A reflected image signal is sensed by the photo sensor on the charge coupled device to be converted to digital data. When a transmissive object such as a transparency needs to be scanned, the transmissive mode, rather than the reflective mode, must be adopted. The light source (hereafter called "transmitting light source") mounted at the opposite side of the charge coupled device is used to scan the transmissive object. A transmitted image signal is sensed by the charge coupled device to be converted to digital data. If the scanning mode is selected incorrectly, the image gotten at last will be ambiguous. The trouble of using the scanner is that the users must know the type of the scanned object and switch among the reflective mode and the transmissive mode of the scanner by themselves. The users are often puzzled by such manual operation when a great number of non-arranged documents including both types of the scanned objects need to be scanned. Apparently, it is inconvenient for the users to switch the scanning mode of the conventional scanner.

SUMMARY OF THE INVENTION

An objective of the present invention is to provide an method for automatically distinguishing the object scanned by a scanner.

In accordance with the present invention, a method is provided for distinguishing an object between a transmissive object and a reflective object used in a transmissive/reflective scanning device having a transmitting light source and a reflecting light source. The method includes steps of (a) turning on a first light source, (b) scanning a first portion of the object to obtain a first image signal by using the first light source, (c) calculating a first scanning value of the first image signal, (d) turning off the first light source and turning on a second light source, (e) scanning a second portion of the object to obtain a second image signal by using the second light source, (f) calculating a second scanning value of the second image signal, and (g) comparing the scanning values to distinguish the object to be one of the transmissive object and the reflective object.

In accordance with another aspect of the present invention, the step (b) further includes a step of (b1) feeding the first portion of the object into the scanning device.

In accordance with another aspect of the present invention, the first portion of the object is preferably the second portion of the object.

In accordance with another aspect of the present invention, before the step (e), the method further includes a step of (e1) withdrawing the first portion of the object from the scanning device. The step (e) further includes a step of (e2) feeding the second portion of the object into the scanning device.

In accordance with another aspect of the present invention, the step (b) preferably includes a step of (b2) detecting a width of the object. The object is preferably a rectangular object.

In accordance with another aspect of the present invention, the first scanning value and the second scanning value are preferably a first average gray scale and a second average gray scale respectively.

In accordance with another aspect of the present invention, the step (c) further includes the steps of (c1) summing up gray scale values of all pixels of the first image signal to get a first sum, and (c2) dividing the first sum by the number of pixels of the first image signal to get the first average gray scale. Likewise, the step (f) further includes the steps of (f1) summing up gray scale values of all pixels of the second image signal to get a second sum, and (f2) dividing the second sum by the number of pixels of the second image signal to get the second average gray scale.

In accordance with another aspect of the present invention, the first light source and the second light source are the transmitting light source and the reflecting light source respectively.

In accordance with another aspect of the present invention, the object is distinguished to be the transmissive object when the first average gray scale is bigger than the second average gray scale. On the contrary, the object is distinguished to be the reflective object when the first average gray scale is no bigger than the second average gray scale.

In accordance with another aspect of the present invention, the object can be distinguished by comparing a specific value with a ratio of the first average gray scale to the second average gray scale. If the ratio is bigger than the specific value, the object is distinguished to be the transmissive object. Otherwise, if the ratio is no bigger than the specific value, the object is distinguished to be the reflective object.

In accordance with another aspect of the present invention, the first light source and the second light source are the reflecting light source and the transmitting light source respectively.

In accordance with another aspect of the present invention, the object is distinguished to be the transmissive object when the first average gray scale is smaller than the second average gray scale. On the contrary, the object is distinguished to be the reflective object when the first average gray scale is no smaller than the second average gray scale.

In accordance with another aspect of the present invention, the object can be distinguished by comparing a specific value with a ratio of the first average gray scale to the second average gray scale. If the ratio is smaller than the specific value, the object is distinguished to be the transmissive object. Otherwise, if the ratio is no smaller than the specific value, the object is distinguished to be the reflective object.

The present invention may best be understood through the following description with reference to the accompanying drawing, in which:

DETAILED DESCRIPTION OF THE PREFERRED EMBODIMENTS

Figure 1:
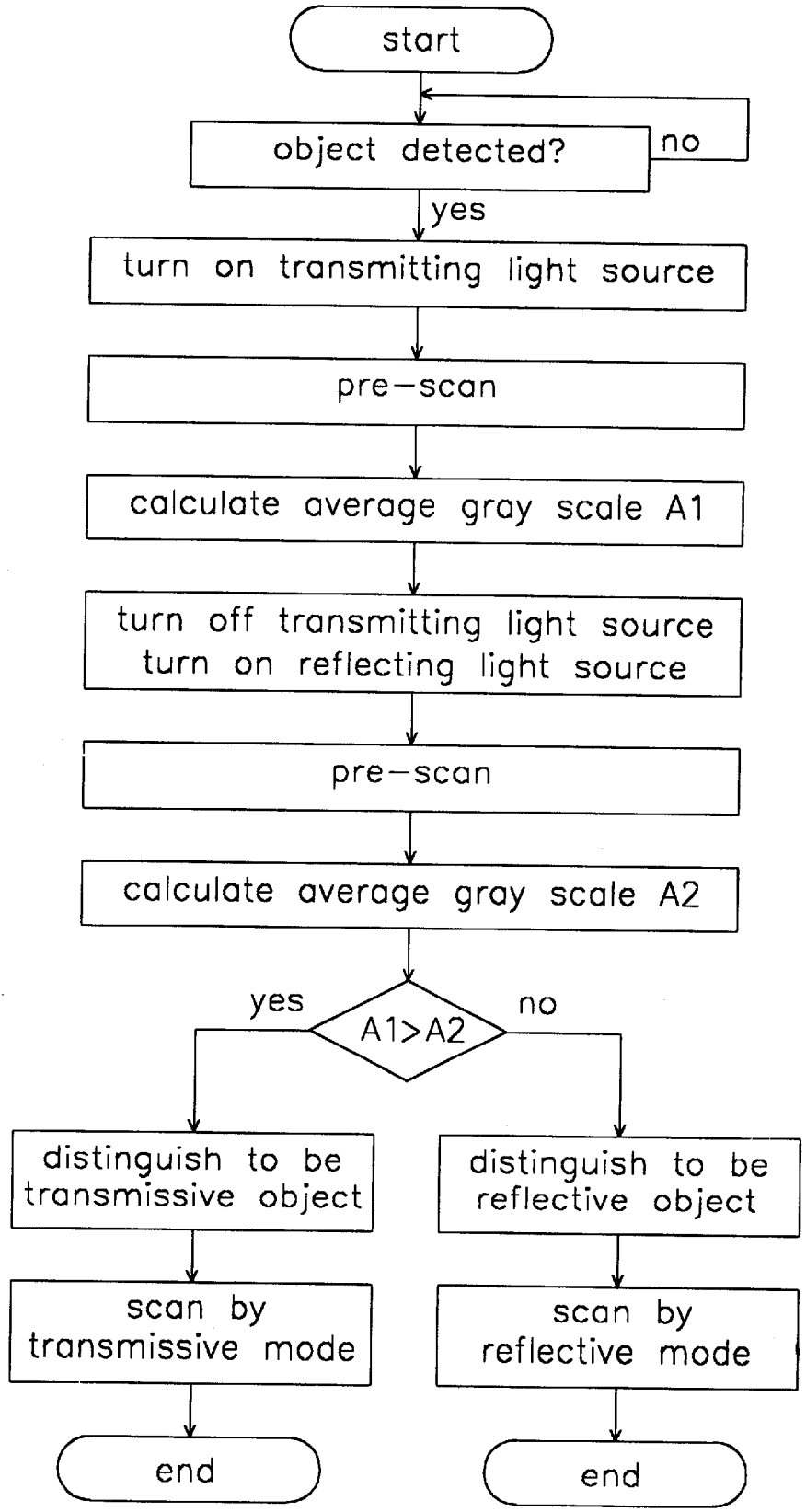
FIG. 1 is a flow chart showing a preferred embodiment of a scanning method according to the present invention.

The present invention will be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

Please refer to FIG. 1 which is a simplified flow chart showing a preferred embodiment of a distinguishing method according to the present invention. The method includes the following steps.

step (1): Detect whether the object is ready. If yes, go on the next step.
step (2): Turn on the transmitting light source.
step (3): Pre-scan a portion of the object to obtain an image signal.
step (4): Calculate the average gray scale A1 of the image signal obtained in the step (3).
step (5): Turn off the transmitting light source and turn on the reflecting light source.
step (6): Pre-scan a portion of the object to obtain another image signal.
step (7): Calculate the average gray scale A2 of the image signal obtained in the step (6).
step (8): Compare the average gray scales A1 and A2.
step (9): If A1>A2, the object is distinguished to be a transmissive object. On the contrary, if A1≦A2, the object is distinguished to be a reflective object.
step (10): Scan the object by the right mode.

The present method is further described in detail by several preferred embodiments. These preferred embodiments show that the present method can be applied to other numerous cases according to the requirement of users.

The method can be applied to a flatbed scanner. First of all, an object is placed on the scanning window to be scanned. The object is preferably a rectangular object so the width of the object is constant. When the scanner detects the object or a scanning instruction is given by the user, the transmitting light source is turned on. The transmitting light source is moved to pre-scan a portion of the object. The length of the pre-scanned portion of the object can be a predetermined value stored in the memory of the scanner or a value determined by the user. The width of the pre-scanned portion of the object, namely, the width of the object is automatically detected by the scanner. After the pre-scanning operation, an image signal is generated. The signal includes many gray scale values of all pixels within the pre-scanned portion. The "gray scale" is a reference scale used in black-and-white image. The gray scale consists of several defined levels of brightness of neutral color. A general standard is that "0" indicates the darkest level and "255" indicates the brightest level. Then, the average gray scale A1 is calculated in an arithmetic unit of the scanner or the computer. The average gray scale A1 is obtained by dividing the sum of gray scale values by the total number of pixels of the image signal. The total number of pixels is known since the length and the width of the pre-scanned portion of the object and the scanning resolution are known.

Thereafter, the transmitting light source is turned off and the reflecting light source is turned on. The reflecting light source is moved to pre-scan a portion of the object. The length of the pre-scanned portion of the object can be also a predetermined value stored in the memory of the scanner or a value determined by the user. The pre-scanned portion scanned by the reflecting light source may be or may be not the same as the pre-scanned portion scanned by the transmitting light source. After the pre-scanning operation, another image signal is generated. The signal also includes many gray scale values of all pixels of the image signal. Hence, another average gray scale A2 is calculated in the arithmetic unit.

The program of the scanner decides the type of the object according to these average gray scales A1 and A2. The ratio of the transmissive average gray scale A1 to the reflective average gray scale A2 can be compared with a specific value to decide which scanning mode is proper. The specific value may be determined by the user. The default value of the specific value is often 1. If the transmissive average gray scale A1 is bigger than the reflective average gray scale A2, it indicates that the object has smaller reflectance than transmittance. Hence, the object should be distinguished to be a transmissive object. If the transmissive average gray scale A1 is no bigger than the reflective average gray scale A2, it indicates that the object has smaller transmittance than reflectance. Hence, the object should be distinguished to be a reflective object. The users can determine the specific value by themselves to calibrate the deviation of the brightness for the scanner. Thus, if the ratio is bigger than the specific value, the object is distinguished to be a transmissive object. On the contrary, if the ratio is no bigger than the specific value, the object is distinguished to be a reflective object.

Thereafter, the scanner can automatically select a proper mode for processing the scanning operation according to the type of the object. If the object is a transmissive object, the reflecting light source is turned off, but the transmitting light source is turned on again to scan the transmissive object. If the object is a reflective object, the reflecting light source which is not turned off yet is used to scan the reflective object.

The typical scan process has been described as above with reference to the flow chart of FIG. 1. Certainly, the light source first used to pre-scan the portion of the object may be the reflecting light source. Thus, the reflective average gray scale is obtained prior to the transmissive average gray scale. The comparing step is similar to the above description. If the reflective average gray scale is smaller than the transmissive average gray scale, the object is distinguished to be a transmissive object. If the reflective average gray scale is no smaller than the transmissive average gray scale, the object is distinguished to be a reflective object. Alternatively, a specific value is inputted to be compared with the ratio of the reflective average gray scale to the transmissive average gray scale. If the ratio is not smaller than the specific value, the object is distinguished to be a transmissive object. Otherwise, if the ratio is no smaller than the specific value, the object is distinguished to be a reflective object. The scanner will select a proper scanning mode to scan the object according to the distinguishing result.

The present distinguishing method can be applied for the sheetfed scanner. At first, the object is fed into the scanner to be scanned. The object is preferably a rectangular object so the width of the object is constant. The transmitting light source is turned on when the scanner detects the object or a scan instruction is given by the user. For a sheetfed scanner, the object is moved, but not the light source, to proceed the scan operation. A fed portion of the object is pre-scanned by the transmitting light source. The length of the pre-scanned portion of the object can be a predetermined value stored in the memory or a value determined by the user. The width of the pre-scanned portion is automatically detected by the scanner. After the pre-scanning operation, an image signal includes data of gray scale values of all pixels within the pre-scanned portion is obtained. An average gray scale A1 is calculated by a software program or by a simple circuit mounted in the scanner.

Thereafter, the transmitting light source is turned off and the reflecting light source is turned on. Another pre-scanning step is executed by the reflecting light source. The object may continue to be being fed so that this pre-scanned portion scanned by the reflecting light source is not the same as that scanned by the transmitting light source, or the object may be withdrawn to be newly fed again to have the same pre-scanned portion. The length of the pre-scanned portion scanned by the reflecting light source may be also a predetermined value or a newly inputted value if these two pre-scanned portions are not the same. After the pre-scanning operation, another image signal is obtained. Hence, another average gray scale A2 is calculated by the software program or the simple circuit.

Then, the program of the scanner decides the type of the object according to these two average gray scales A1 and A2. If the transmissive average gray scale A1 is bigger than the reflective average gray scale A2, the obtained average gray scale is not sufficient enough to obtain high scanning quality if the reflective mode is used to scan the object. In other words, the object should be classified as a transmissive object because the higher scanning quality can be achieved when the scanner is in the transmissive mode. On the contrary, if the transmissive average gray scale A1 is no bigger than the reflective average gray scale A2, the object is classified as a reflective object. Alternatively, the type of the object may be decided by comparing a specific value with a ratio of the transmissive average gray scale A1 to the reflective average gray scale A2. The specific value may be determined by the user for eliminating the error of the brightness of the scanner. The default value is often 1. If the ratio is bigger than the specific value, the object is classified as a transmissive object. Otherwise, if the ratio is no bigger than the specific value, the object is classified as a reflective object.

Because the type of the object is determined, the scanning mode can be selected corresponding to the type of the object. The object is withdrawn backward to the start position and is fed into the scanner again to be scanned to obtain the full image signal. If the object is a transmissive object, the reflecting light source is turned off and the transmitting light source is turned on again to scan the transmissive object. If the object is a reflective object, the reflecting light source which is not turned off yet is used to scan the reflective object.

There is no doubt that which light source is turned on at first to pre-scan the object can be changed. The scanning steps are similar to those described in the preceding preferred embodiment. If the reflective average gray scale is smaller than the transmissive average gray scale, the object is classified to be a transmissive object. If the reflective average gray scale is no smaller than the transmissive average gray scale, the object is classified to be a reflective object. Alternatively, the user can input a specific value to be compared with a ratio of the reflective average gray scale to the transmissive average gray scale. If the ratio is smaller than the specific value, the object is distinguished to be a transmissive object. Otherwise, if the ratio is no smaller than the specific value, the object is distinguished to be a reflective object.

In conclusion, the present invention provides an automatically distinguishing method for judging the type of the object. It is more convenient for the users to scan mixed kinds of objects because they need not switch the scanning mode one by one. More specially, the method seems user-friendly when he or she has a great number of mixed kinds of objects to be scanned.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for distinguishing an object to be scanned by a transmissive/reflective dual-mode image scanner as a transmissive object or a reflective object, said transmissive/reflective dual-mode image scanner having a transmitting light source and reflecting light source, and said method comprising:

(a) turning on one of said transmitting and reflecting light sources to serve as a first light source;

(b) pre-scanning a first portion of said object by using said first light source to obtain a first pre-scan image signal;

(c) calculating a first scanning value of said first pre-scan image signal;

(d) turning off said first light source and turning on the other of said transmitting and reflecting light sources to serve as a second light source;

(e) pre-scanning a second portion of said object by using said second light source to obtain a second pre-scan image signal;

(f) calculating a second scanning value of said second pre-scan image signal; and (g) distinguishing said object to be transmissive object or said reflective object according to said first scanning value and said second scanning value so as to determine which one of said transmitting light source and said reflecting light source will be used for a subsequent scanning operation.

2. A method according to claim 1 wherein said step (b) comprises a step of (b1) feeding said first portion of said object into said image scanner.

3. A method according to claim 2 wherein said first portion of said object is the same as said second portion of said object.

4. A method according to claim 2 wherein before said step (e), said method further comprises a step of (e1) withdrawing said first portion of said object from said image scanner.

5. A method according to claim 4 wherein said step (e) comprises a step of (e2) feeding said second portion of said object into said image scanner.

6. A method according to claim 1 wherein said step (b) further comprises a step of (b2) detecting a width of said object.

7. A method according to claim 6 wherein each of said first and said second portions of said object has a rectangular shape with said width.

8. A method according to claim 1 wherein said first scanning value and said second scanning value are a first average gray scale value and a second average gray scale value, respectively.

9. A method according to claim 8 wherein said step (c) comprises steps of:

(c1) summing up gray scale values of all pixels of said first pre-scan image signal to get a first sum; and (c2) dividing said first sum by a total number of said pixels of said first pre-scan image signal to get said first average gray scale value.

10. A method according to claim 9 wherein said step (f) comprises steps of:
(f1) summing up gray scale values of all pixels of said second pre-scan image signal to get a second sum; and
(f2) dividing said second sum by a total number of said pixels of said second pre-scan image signal to get said second average gray scale value.

11. A method according to claim 10 wherein said first light source and said second light source are said transmitting light source and said reflecting light source, respectively.

12. A method according to claim 11 wherein said object is distinguished to be said transmissive object when said first average gray scale value is bigger than said second average gray scale value.

13. A method according to claim 11 wherein said object is distinguished to be said reflective object when said first average gray scale value is no bigger than said second average gray scale value.

14. A method according to claim 11 wherein said object is distinguished to be said transmissive object when a ratio of said first average gray scale value to said second average gray scale value is bigger than a specific value.

15. A method according to claim 11 wherein said object is distinguished to be said reflective object when a ratio of said first average gray scale value to said second average gray scale value is no bigger than a specific value.

16. A method according to claim 10 wherein said first light source and said second light source are said reflecting light source and said transmitting light source, respectively.

17. A method according to claim 16 wherein said object is distinguished to be said transmissive object when said first average gray scale value is smaller than said second average gray scale value.

18. A method according to claim 16 wherein said object is distinguished to be said reflective object when said first average gray scale value is no smaller than said second average gray scale value.

19. A method according to claim 16 wherein said object is distinguished to be said transmissive object when a ratio of said first average gray scale value to said second average gray scale value is smaller than a specific value.

20. A method according to claim 11 wherein said object is distinguished to be said reflective object when a ratio of said first average gray scale value to said second average gray scale value is no smaller than a specific value.

21. A method for distinguishing an object to be scanned by a transmissive/reflective dual-mode image scanner as a transmissive object or a reflective object so as to optionally perform a transmissive or reflective scanning operation, said image scanner including a transmitting light source and a reflecting light source for said transmissive and said reflective scanning operations, respectively, and said method comprising:

turning on one of said transmitting light source and said reflecting light source;

using said one of light source as a working light source of said image scanner to scan said object to obtain at least two gray scale values;

mathematically processing said at least two gray scale values to obtain a first index gray scale value;

turning on the other one of said transmitting light source and said reflecting light source;

using said the other one of light source as a working light source of said image scanner to scan said object to obtain at least two gray scale values;

mathematically processing said at least two gray scale values to obtain a second index gray value; and determining said object to be said transmissive object or said reflective object by comparing said first index gray scale value with said second index gray scale value.

22. A method according to claim 21 wherein said index gray scale value is an average of all obtained gray scale values.

23. A method for distinguishing an object to be scanned by a transmissive/reflective dual-mode image scanner as a transmissive object or a reflective object so as to optionally perform a transmissive or reflective scanning operation, said image scanner including a transmitting light source and a reflecting light source for said transmissive and said reflective scanning operations, respectively, and said method comprising:

turning on one of said transmitting light source and said reflecting light source;

using said one of light source as a working light source of said image scanner to scan said object to obtain at least two gray scale values;

mathematically processing said at least two gray scale values to obtain a first index gray scale value;

turning on the other one of said transmitting light source and said reflecting light source;

using said the other one of light source as a working light source of said image scanner to scan said object to obtain at least two gray scale values;

mathematically processing said at least two gray scale values to obtain a second index gray scale value; and determining said object to be which one of said transmissive object and said reflective object by comparing a ratio of said first index gray scale value to said second index gray value with a specific value.

24. A method according to claim 23 wherein said index gray scale value is an average of all obtained gray scale values.

* * * * *